(12) United States Patent
Shank

(10) Patent No.: US 6,478,880 B1
(45) Date of Patent: Nov. 12, 2002

(54) MULTI-COMPONENT SOLVENT SYSTEMS FOR FLUORINATED COMPOUNDS AND CLEANERS AND DELIVERY SYSTEMS BASED THEREON

(75) Inventor: Gary K. Shank, Rocky Hill, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/787,430

(22) PCT Filed: Sep. 24, 1999

(86) PCT No.: PCT/US99/22151

§ 371 (c)(1),
(2), (4) Date: Mar. 26, 2001

(87) PCT Pub. No.: WO00/18984

PCT Pub. Date: Apr. 6, 2000

Related U.S. Application Data

(60) Provisional application No. 60/102,283, filed on Sep. 29, 1998.

(51) Int. Cl.⁷ .......................... C23G 5/028; C11D 3/24; C08K 5/02; C08K 5/03; B01F 3/08
(52) U.S. Cl. .................. 134/40; 510/245; 510/256; 510/273; 510/405; 510/407; 510/412; 510/506
(58) Field of Search .................. 510/245, 256, 510/273, 405, 407, 412, 506; 134/40

(56) References Cited

U.S. PATENT DOCUMENTS

| | | | | |
|---|---|---|---|---|
| 5,401,429 A | | 3/1995 | Flynn et al. ................. | 252/171 |
| 5,403,514 A | * | 4/1995 | Matsuhisa et al. ........... | 252/364 |
| 5,484,489 A | | 1/1996 | Flynn et al. ................... | 134/42 |
| 5,594,601 A | | 1/1997 | Mimick et al. ............. | 360/72.2 |
| 5,744,436 A | * | 4/1998 | Flynn et al. ................. | 510/178 |
| 5,744,437 A | | 4/1998 | Rowe et al. ................. | 510/204 |
| 5,756,002 A | | 5/1998 | Chen et al. ................. | 252/364 |
| 5,925,611 A | | 7/1999 | Flynn et al. ................. | 510/412 |
| 6,303,549 B1 | * | 10/2001 | Burdzy et al. .............. | 508/582 |

FOREIGN PATENT DOCUMENTS

| | | | |
|---|---|---|---|
| WO | WO 98/42774 | 10/1998 | ............... C08J/7/02 |

\* cited by examiner

*Primary Examiner*—Gregory Delcotto
*Assistant Examiner*—Brian P. Mruk
(74) *Attorney, Agent, or Firm*—Steven C. Bauman

(57) ABSTRACT

Multi-component compositions comprising as a first component a fluorinated compound, as a second component a fluorinated aromatic compound and a third component comprising an alkane are disclosed. These compositions can be formulated to provide single phase systems which serve as effective solvents for fluorinated oils as well as petroleum oils. The compositions can serve as solvent cleaners or can be combined directly with oils to provide a delivery system for the oil.

49 Claims, No Drawings

MULTI-COMPONENT SOLVENT SYSTEMS FOR FLUORINATED COMPOUNDS AND CLEANERS AND DELIVERY SYSTEMS BASED THEREON

This application claims the benefit of provisional application No. 60/102,283 filed Sep. 29, 1998.

BACKGROUND OF THE INVENTION

1. Field of the Invention

This invention relates to multi-component compositions having utility as cleaners, delivery systems, solvent systems and the like. In particular, the invention relates to a composition including both fluorinated and non-fluorinated components, which can form single phase combinations and permit solubility of highly fluorinated, as well as partially fluorinated, compounds which are ordinarily not soluble in polar or most hydrocarbon solvent materials.

2. Brief Description of Related Technology

In recent years, the use of both chlorinated and chlorofluoro hydrocarbons ("CFCs") have been substantially lessened due to their deleterious effect on the environment and stringent regulations have been promulgated throughout the world to accelerate their phase-out. Many of these materials are not only toxic but are believed responsible for ozone-depletion. Thus, notwithstanding their usefulness as solvents, strict laws regarding handling, labeling and disposal have been passed to discourage further use. Finding acceptable alternatives to these solvents has been an extremely difficult task, particularly to find solvents or solvent systems which possess a balance of important properties required for many industrial applications such as high chemical stability, non-flammability, low toxicity and low volatile organic solvent ("VOC") content, and yet which are sufficiently volatile to readily evaporate once applied. In particular, it has been difficult to find solvent systems for highly fluorinated compounds such as perfluorocarbons ("PFCs") and the like because of their extremely low solubility, if any, in conventional solvent materials such as polar solvents and in most hydrocarbons, including acids and bases.

It is desirable that solvent systems for delivery of a material, such as a highly fluorinated compound, to or cleaning a highly fluorinated compound from a substrate, possess a balance of characteristics in addition to their ability to solubilize or otherwise combine in a compatible way with the material. For example, solvent systems desirably balance non-ozone depleting and non-flammable characteristics with sufficient volatility characteristics to be useful as cleaners or delivery systems. Although many materials possess the ability to act as volatile solvents, most have been too flammable or toxic to serve as suitable replacements for conventional ozone-depleting compounds such as chlorinated hydrocarbons or CFCs. For example, materials such as heptane, acetone, methylethyl ketone, isopropanol, and methanol are excellent solvents for many substances and possess good volatility, i.e., low flash point temperatures and high vapor pressures, but these materials are extremely flammable. Other substances such as isoparaffins and propylene glycol ether are less flammable, but do not exhibit adequate solvent performance properties for materials such as highly fluorinated compounds.

PFCs are essentially non-toxic, non-flammable, and thermally and hydrolytically stable alternatives to CFCs. However, the drawback of PFCs is the inability to form solutions with most substances. Moreover, the cost of PFCs is extremely high and commercially unattractive for most industrial applications. Thus, their suitability as cleaners or as carriers in delivery systems has been largely stilted.

Attempts have been made to combine perfluorinated compounds with solvents to form azeotropic compositions. For example, U.S. Pat. Nos. 5,401,429, 5,484,489, 5,594,601, and 5,744,436 disclose azeotropic compositions which include a perfluorinated cycloaminoether and an organic solvent, such as tetrafluorocyclobutane, tetrafluorodichloroethane, cyclopentane, cyclohexane and the like. These compositions are disclosed as being cleaners for electronic printed circuit boards, magnetic media, disk drives, medical articles and the like. The article to be cleaned is generally contacted with the azeotropic composition while the composition is boiling or otherwise agitated. Certain of the azeotropic compositions disclosed were used as vapor degreasing compositions.

U.S. Pat. No. 5,403,514 discloses a non-flammable solvent composition which comprises 40% by volume or more of a non-flammable perfluoro organic compound. The other portion of the composition is a flammable organic compound which is suitable as a degreasing solvent.

A single phase liquid composition comprising 2–20% benzotrifluoride, 5–50% glycol ether, 2–40% alkanol and 7–56% water is disclosed in U.S. Pat. No. 5,744,437. This composition is described as being effective in cleaning hard surfaces, stripping paint, and as a carrier.

U.S. Pat. No. 5,756,002 discloses a two-part, single-phase cleaning solvent which is a combination of a selected fluorinated compound in amounts of 3 to about 20 weight %, with the remainder being benzotrifluoride. The '002 patent describes this blend as being non-flammable and being a better cleaner than the fluorinated compound itself. The composition can optionally contain up to 15 weight % alkanol from $C_1$ to $C_4$.

Fluorinated oils are not soluble in traditional solvents. Their utility in industry is widespread however, due to their properties of being excellent lubricants under severe chemical conditions and at elevated temperatures. It is well-known that their performance properties are beyond those of most hydrocarbon based lubricants. Whereas elevated temperatures, aggressive chemicals, flammable conditions and airborne contaminants can quickly exceed the performance capabilities of many hydrocarbon lubricants, this is not the case for fluorinated lubricants.

It is desirable to incorporate the advantages of a fluorinated base stock, i.e., a carrier system, with those of fluorinated oils to provide a lubricant composition for applications where temperature, flammability, or other factors exceed the performance of conventional petroleum lubricants. Moreover, it is desirable to find a penetrating lubricant composition that is non-flammable, non-ozone depleting and which can be used in areas where fire hazards may exist.

A common generally acceptable principle in organic chemistry with respect to solvents is stated by Morrison and Boyd in *Organic Chemistry,* page 31, Allyn and Bacon, 3rd ed. (1973). This rule states that for the most part "like dissolves like". Based on this principle, highly fluorinated oils could be dissolved by highly fluorinated solvents. In fact some perfluorinated oils are known to be soluble in fully or partially fluorinated solvents such as decafluoropeutane and methoxy-nonafluorobutane. However, highly fluorinated solvents are extraordinarily expensive and use of them as the sole solvent would not be commercially feasible. The present invention utilizes the affinity of two different fluorinated components in combination with an alkane to produce a cost-effective solvent system useful with perfluorinated and partially fluorinated oils, as well as other materials.

It is apparent that there is a need for a composition which can serve as a solvent for difficult to dissolve materials, i.e., fluorinated compounds, and which can have a wide range of applications including use as a cleaner or a delivery system for such materials. Moreover, there is a need for a low cost composition which also possesses a balance of characteristics with respect to volatility, low toxicity, non-ozone depleting properties and non-flammability as discussed herein. The present invention provides compositions which meet these and other needs.

SUMMARY OF THE INVENTION

The present invention is directed to compositions which comprise a combination of at least three components—the first component including a fluorinated compound; the second component including a fluorinated aromatic compound; and the third component including an alkane. The first and second fluorinated components are intended to be different. This combination of components allows for compositions to be formulated which are useful as cleaners and/or delivery systems as well as solvent systems for a variety of materials. In particular, the compositions of the present invention have excellent applicability for use with highly fluorinated materials, such as fluorinated oils, either as a cleaner to remove the fluorinated materials from a substrate or as a carrier to deposit the fluorinated material onto a substrate.

The present invention further includes a composition including a material such as a fluorinated oil, and a combination of components compatible with the fluorinated material the combination including a first component comprising a fluorinated compound; a second component different from the first comprising a fluorinated aromatic compound; and a third component comprising an alkane.

The compositions of the present invention once formed are most desirably in a single phase system. Single phase systems allow for more effective cleaning compositions and delivery systems to be made, particularly when difficult to dissolve materials such as fluorinated oils requiring removal from or delivery to a substrate are involved. However, while the single phase system is the most desirable physical form of the present compositions, emulsions, dispersions or other combinative forms may be formulated to meet a wide variety of applications.

The inventive compositions can be further combined with a propellant and packaged in aerosol containers. Accordingly, the present invention also contemplates articles of manufacture which include a container for packaging a flowable composition; a flowable composition within the container, the composition including a combination of a first component comprising a fluorinated compound, a second component different from the first comprising a fluorinated aromatic compound, and a third component comprising an alkane. A method of cleaning an oil from a substrate is also contemplated within the present invention and includes the steps of providing a composition having a first component comprising a fluorinated compound, a second component different from the first comprising a fluorinated aromatic compound, and a third component comprising an alkane; and applying the composition to an oil-bearing substrate to remove the oil from the substrate.

A method of manufacturing a fluorinated oil composition is also described including the steps of combining of a first component comprising a fluorinated compound; a second component different from the first comprising a fluorinated aromatic compound; a third component comprising an alkane; and a fluorinated oil.

DETAILED DESCRIPTION OF THE INVENTION

In one embodiment, the present invention relates to a composition, which includes a combination of at least three components. The first component includes a fluorinated compound. The second component is different from the first and includes a fluorinated aromatic compound. The third component includes an alkane.

Among the most desired fluorinated compounds useful for the first component are those which contain a fluorinated portion, which portion is substantially soluble in a fluorinated oil. In effect, the fluorinated portion renders the compound more compatible with or miscible in fluorinated materials due to their respective fluorinated parts. While a broad range of fluorinated compounds are useful, most desired as the first component are fluorinated compounds selected from the group consisting of fluorinated ethers, fluorinated alkanes and combinations thereof. Among this group, the first fluorinated component is selected from fluorinated alkyl groups having from 4 to 10 carbon atoms, fluorinated ether compounds corresponding to formula $R^1OR^2$, where $R^1$ and $R^2$ may be the same or different and are alkyl groups having from 1 to 4 carbon atoms, and combinations thereof.

Among the desirable classes of fluorinated compounds useful for the first component are the partially fluorinated ethers. This class of fluorinated ethers is soluble in perfluorinated oils in virtually all proportions. Among the commercially available partially fluorinated ethers particularly useful is methyl nonafluorobutyl ether, having the formula $F_3CCF_2CF_2CF_2OCH_3$.

Among the fluorinated alkanes useful in the first component of the composition include $CF_3CHFCHFCF_2CF_3$, $CF_3CH_2CHFCF_2CF_3$, $CF_3CHFCH_2CF_2CF_3$, $CF_3CHFCHFCF_2CF_2CF_3$, $CF_3CH_2CHFCF_2CF_2CF_3$, $CF_3CHFCH_2CF_2CF_2CF_3$, $CF_3CF_2CH_2,CHFCF_2CF_3$, $CF_3CF_2CHFCHFCF_2CF_2CF_3$, $CF_3CHFCH$ $FCF_2CF_2CF_2CF_3$, $CF_3CHFCH_2CF_2CF_2CF_2CF_3$, $CF_3CH_2CHFCF_2CF_2CF_2CF_3$, $CF_3CF_2CH$ $FCH_2CF_2CF_2CF_3$, and $CF_3CF_2CH_2CHFCF_2CF_2CF_3$. Combinations of these compounds are contemplated. Decafluoropentane has been found to be particularly useful.

The second component of the composition—which includes a fluorinated aromatic compound—desirably includes a fluorinated benzene compound selected from the group consisting of benzotrifluoride, p-chlorobenzotrifluoride, dichlorobenzotrifluoride, trifluorotoluene and combinations thereof. Benzotrifluoride and p-chlorotrifluoride have been found to be particularly effective, alone or in combination. The second component may only be partially soluble or substantially insoluble in fluorinated oil.

The third component of the composition includes an alkane which desirably corresponds to the general structural formula $C_nH_{2n+2}$ wherein n is an integer from 5 to 20. Hexane has been found to be particularly useful.

It has been discovered that the relative amounts of the three components of the composition can be adjusted to provide a single phase solvent system. This is quite surprising in that alkanes are only slightly soluble at best in either of the other fluorinated components. The present invention allows for a significant percentage of the composition to be an alkane. Since the alkane is inexpensive relative to fluorinated solvent compounds such as perfluoroalkylpolyethers, the inclusion of the alkane allows for a significant reduction in cost of the overall composition. Moreover, the presence of an alkane solvent in the composition further provides the ability to dissolve petroleum oils, greases and organic residue to a certain degree. The ability to form a stable single-phase is even further surprising in that many of the useful fluorinated aromatic compounds used as a second component in the inventive composition are not readily soluble in the partially or fully fluorinated oils used in oil-containing embodiments of the present invention. However, when their proportions are adjusted to within certain ranges, they form a single phase multi-component solvent system which exhibits phase stability.

A single phase composition facilitates the delivery of each of the components in their relative proportions, either for cleaning purposes or when used as a vehicle to deliver other active materials such as fluorinated oils. Thus, in its most desired form, the composition of the present invention is as a whole substantially soluble in or substantially solubilizes fluorinated oil.

For purposes of the present invention, the term "nonflammable" will mean a flash-point of greater than about 200° F. (94° C.), whereby heating is required for the material to catch fire; and the term "flammable" will mean the material is ignitable with a spark rather than by heating, and having a flash-point of about less than 100° F. (38° C.). Generally, compounds which have a flash-point between 140–200° F. (60°–93° C.) are classified as combustible. The above definitions are believed to be generally accepted ones in accordance with those set by the U.S. Department of Transportation (DOT).

To form a single phase solvent system, the upper limit of the first component comprising a fluorinated compound, to the combination of the second and third components comprising a fluorinated aromatic compound and an alkane is respectively about 1:1.2. Amounts greater than this are useful, of course, if the single phase is not the desired state. For example, if phase separation is suitable for the particular application, where the addition of a compatibilization component or simple agitation would result in an emulsion, dispersion or suspension, the proportion of the first component can be outside the upper limit.

It is contemplated that additional components may be added to cause what would ordinarily be a multi-phase system to become a single-phase system. Other methods for obtaining a single phase include controlling the ambient conditions of temperatures and pressure in the dispensing container to cause the components to solubilize in each other or be more miscible. The relative amounts of the third component comprising an alkane, to the second component comprising a fluorinated aromatic compound, have a maximum ratio of about 1:1.5 in order to obtain a single phase. Again, amounts outside this maximum ratio may be useful provided the desired result is not to obtain a single phase system. Thus, in compositions of the present invention intended to obtain a single phase system, i.e., a multi-component solvent composition, the ratio of the first component to the combination of the second two components and the ratio of the second component to the third component are generally within the maximum ratio values given above. Moreover, in embodiments where the composition is to include a propellant, the propellant can also be chosen so that it is soluble or otherwise compatible with the overall composition such that it can be dispensed in a single phase, thereby avoiding separation of the propellant from the other components in the container during storage.

Fluorinated compounds useful as the first component can be present in amounts of about 25% by weight of the three component composition, or greater. In one desired embodiment, the first component is present in amounts of about 25% to about 60% and more desirably about 30% to about 45% by weight of the three component composition. When calculated on a total weight percent basis, i.e., including oils, additives, propellants and the like, the first component may be present in amounts of about 15% and 50% by weight, and more desirably in amounts of about 17% to about 30% by weight of the total composition.

The second component—which includes the fluorinated aromatic compound—is generally present in amounts of about 5% to about 50% by weight of the three component composition. In one desired embodiment, this component is present in amounts of about 5% to about 30% by weight of the three component composition. When calculated on a total composition weight percent basis, i.e., including oils, additives, propellants and the like, the second component may be present in amounts of about 5% to about 25% by weight of the total composition.

The third component comprising an alkane is generally present in amounts of at least 2% by weight, desirably in amounts of 15% to about 40% by weight, and more desirably in amounts of about 20% to about 30% by weight of the three component composition. When calculated on a total composition weight % basis, i.e., including oils, additives, propellants and the like, the third component may be present in amounts of about 5% to about 15% by weight of the total composition.

The compositions of the present invention can further include a fluorinated oil which is at least partially soluble and desirably soluble or otherwise miscible therein. A variety of fluorinated oils may be employed, including perfluoropolyether oils. Among the perfluoropolyether oils considered desirable are those which are perfluoroalkylpolyethers. For example, useful perfluoroalkylpolyether oils may be selected from $CF_3CF_2CF_2O—[CF\ (CF_3)CF_2—O—]_n—CF_2CF_3$, $CF_3O—[CF(CF_3)\ CF_2—O—]_y—[CF_2—O]_mCF_3$, $CF_3O—[CF_2CF_2—O—]_z—[CF_2—O—]CF_3$, $CF_3CF_2—[CF_2—O—]_qCF_2\ Cf_3$, halocarbons containing the repeating group $—(CF_2CFCl)_r—$, where r is an integer from 2 to 10 and having an average molecular weight of from about 230 to about 1200 and combinations thereof; where n is an integer from 0 to 60; y is an integer from 0 to 60; m is an integer from 0 to 60; z is an integer from 0 to 60; p is-an integer from 0 to 60; and q is an integer from 0 to 60. Of particular utility is the fluorinated oil corresponding to the formula $F[CF(CF_3)CF_2O]_nCF_2CF_3$, where n is an integer from 10 to 60. This fluorinated oil is commercially available under the trademark KRYTOX sold by DuPont, Wilmington, Del.

The fluorinated oil may be present in the composition in any useful amount. Desirably, the fluorinated oil is present in amounts of about 18% to about 90% by weight of the total composition and desirably in amounts of about 20% to about 50% by weight. As previously mentioned, in one desirable embodiment the oil is in solution with the combination of the other three required components, although it is contemplated that dispersions, emulsions, suspensions or other combinative forms may be used. Solutions or single phase systems have advantages in many applications over multi-phase systems. The present invention derives the benefits of a single-phase in a cost effective manner. Whereas highly fluorinated compounds may serve as solvents for fluorinated oils, such solvents are extraordinarily expensive and therefore their commercial utility in high volume applications is greatly lessened. The present invention allows for multi-component, single-phase solvent systems to be made in which the fluorinated oil is soluble therein and the cost of such systems is a fraction of systems having single component highly fluorinated materials.

Compositions of the present invention can be formulated into aerosol compositions by the addition of suitable propellants. As previously mentioned, if a single-phase system is desired, it is often advantageous to choose a propellant which is also soluble or miscible with the remainder of the composition. Suitable propellants for use in the present invention include, without limitation, carbon dioxide, isobutane, dimethylether, 1,1,1,2-tetrafluoroethane and combinations thereof. When present, the propellant may be utilized in amounts sufficient to facilitate delivery of the composition from an aerosol container. For example, the propellant may be present in amounts of about 1% to about 50%, and most desirably in amounts of about 25% to about 35% by weight of the total composition.

In one particular embodiment of the present invention, there is provided a fluorinated oil aerosol composition including a) a fluorinated oil; b) a combination of components compatible with the oil; and c) an aerosol propellant. The combination of components of b) includes i) a first component including a fluorinated compound present in amounts of about 25% or greater by weight of the combination; ii) a second component including a fluorinated aromatic compound present in amounts of about 5% to about 10% by weight of the combination; and iii) a third component including an alkane.

Among the fluorinated oils useful in this aerosol composition include those previously mentioned, as well as others known in the art. As mentioned above, the three component combination of the present invention may have a first component selected from fluorinated alkanes having from 4 to 10 carbons, a fluorinated alkylether corresponding to the general formula $R^1OR^2$, where $R^1$ and $R^2$ may be the same or different and are fluorinated alkyl groups having from 1 to 4 carbon atoms and combinations thereof. The second component is desirably selected from benzotrifluoride, p-chlorobenzotrifluoride, dichlorobenzotrifluoride, trifluorotoluene and combinations thereof. The alkane may be selected from compounds which correspond to the general formula $C_nH_{2n+2}$, where n is an integer from 2 to 20. The fluorinated oil aerosol compositions may have a variety of other additives included, as will be discussed herein.

The compositions of the present invention may be used for a variety of products and applications. For example, among those types of products contemplated include solvent systems with particular application on materials which are difficult to dissolve in conventional solvents, such as fluorinated materials and particularly fluorinated oils. The inventive compositions may be used to deliver fluorinated oils onto a substrate and quickly volatilize to deposit the oil thereon. Other products include use as cleaning compositions, such as degreasing compositions, whereby oils or greases, and particularly fluorinated oils, can be readily removed from a substrate by application of the inventive composition.

Due to the relative solubility of the components of compositions made in accordance with the present invention, these compositions form particularly effective aerosol products which are capable of delivering the components in their relative proportions. Thus, there is contemplated in an article of manufacture which includes a container for packaging a flowable composition, the flowable composition including the aforementioned three component combination of a first fluorinated compound, a second different fluorinated aromatic compound and an alkane. The container for such an article of manufacture may be any conventional container known to the art. Of particular utility are containers which are suitable for spraying the composition, such as aerosol containers having a nozzle designed to release the composition under pressure. One particular aerosol container which is contemplated includes an outer housing and a flexible bladder contained therein. The external wall of the bladder and the internal wall of the outer housing define a space in which a propellant can be contained. The bladder can contain the compositions of the present invention and may be designed to be permeable to the propellant. Alternatively, the bladder itself can provide the compressive force necessary to dispense its contents.

The invention compositions of the present invention may also include a number of additives. Non-limiting examples of useful additives include compounds and classes of compounds which fall into the categories of anti-wear and extreme pressure additives, friction or lubricity modifiers, corrosion inhibitors, oxidation inhibitors and the like. These materials can be included in amounts sufficient to impart their intended function and effect.

Among those useful anti-wear and extreme pressure additives are zinc dialkyldithiophosphate, molybdenum disulfide, tricresyl phosphate, alkyl and aryl disulfides, polysulfides, dithiocarbamates, sulfurized fats, chlorinated paraffins and non-chlorinated replacements. Combinations of these additives are also contemplated.

Among the friction or lubricity modifiers, useful are graphite, zinc oxide and polytetrafluoroethylenes. Combinations of these modifiers are also contemplated.

Corrosion inhibitors useful in the present invention include long-chain amines, alkyl succinic acids, mildly polar organic acids such as the salts of benzoic acids, amine salts, sodium nitrite, sodium molybdenate, sodium sulfonate, calcium sulfonate, organic phosphates, polyhydric alcohols, dicyclohexylamine, triazole derivatives and cycloparaffin, e.g., naphthenate salts. Combinations of these inhibitors are also contemplated.

Oxidation inhibitors included hindered amines, such as naphthyl (phenyl) amine and hindered phenols, such as di-tert-butyl-p-cresol and 2-naphthol. Combinations of these inhibitors are also contemplated.

Stabilizers, viscosity modifiers, odor masking agents, coloring agents, plasticizers, other conventional additives and combinations thereof may also be employed.

The aforementioned additional additives can be present in amounts sufficient to impart their intended effect.

In addition to being useful as a delivery system for oils, other active materials, i.e., materials which are intended to be carried by the inventive compositions for deposition onto a substrate may be employed. For example, adhesive promoter agents and promoter compositions may be included in the inventive compositions. The composition is applied to a substrate and permitted to volatilize thereby leaving behind the promoter component. The type of promoter component will depend for the most part on the type of adhesive composition to be employed as well as the type of substrate to be bonded. For example, cyanoacrylates, anerobics, acrylics, epoxies and olefins have classes of compounds which activate, accelerate or otherwise promote their cure and/or enhance adhesion.

While the aforementioned aerosol version of the present invention takes advantage of many of the soluble properties, other forms of applying the composition to a substrate may be employed. For example, spraying, dipping, brushing, swabbing, wiping, roller coating, and the like onto a substrate is contemplated.

The features and the advantages of the present invention will be more clearly understood by reference to the following examples, which serve as an illustration of the invention but are not to be construed as limiting the scope of the invention.

EXAMPLES

Example 1

This example demonstrates the ability of single phase solvent systems to be made from the present invention. The present invention provides a solvent system in which a fluorinated oil is soluble so as to make a penetrating oil product. The solubility of fluorinated oils such as polyfluorinated polyethers in most common organic solvents is shown in Table 1 below. This table is reproduced from commercial available literature from DuPont. As can be seen, at best these fluorinated oils are only slightly or partially soluble in common organic solvents.

TABLE 1

Solubility of Perfluorinated Oils (PFPE-2* Oils) in Common Organic Solvents

| Solvent | Solubility of PFPE in Solvent | Solubility of Solvent in PFPE | Gms Solvent in 100 gms PFPE |
|---|---|---|---|
| Hexane | SS | PS | 2.0 |
| n-Heptane | PS | SS | 1.6 |
| n-Octane | I | I | — |
| Cyclohexane | I | I | — |
| Benzene | I | SS | 1.3 |
| Toluene | I | I | — |
| Xylene | I | I | — |
| Ethyl ether | SS | PS | 2.6 |
| Tetrahydrofuran | I | SS | 1.4 |
| Ethyl acetate | I | I | 1.5 |
| Methyl formate | I | I | — |
| Dimethyl ketone | I | I | — |
| Methylethyl ketone | I | I | — |
| Trichloroethylene | I | PS | 3 |
| Monochlorobenzene | I | I | — |
| Chloroform | SS | PS | 4.1 |
| Carbon tetrachloride | SS | PS | 2.9 |
| Perfluoroalkanes | miscible | miscible | — |

SS = slightly soluble, PS = partially soluble, and I = practically insoluble
*PFPE-2 Oils are one class of perfluoroalkylpolyethers.

The following three component composition was made as a stock composition in accordance with the present invention.

Composition A

| Component | | % By Weight |
|---|---|---|
| First: | Methoxy-nonafluorobutane | 45 |
| Second: | Benzotrifluoride | 25 |
| Third: | Hexane (95%–99% n-Hexane) | 30 |

Compositions A was prepared by mixing methoxy-nonafluorabutane with benzotrifluoride and thoroughly agitating. To this combination hexane was added, again following with thorough agitation. A single-phase system resulted which remained stable over time. This composition was useful as a cleaner for oils, greases and the like. In particular, it was exceptionally effective in dissolving highly fluorinated oils such as the perfluoroalkylpolyethers mentioned herein. In particular, the fluorinated oil sold under the trademark KRYTOX mentioned previously was soluble in Composition A, as were a variety of halocarbons containing the repeating group —$(CF_2CFCl)_r$—, where r is an integer from 2 to 10 and having a molecular weight in the range of about 230 to about 1200.

Composition A was also found to be an effective solvent delivery vehicle for fluorinated oils.

Example 2

A penetrating oil composition was prepared in accordance with the present invention with the following composition:

Composition B

| Component | | % By Weight |
|---|---|---|
| First: | Methoxy-nonafluorobutane | 32.4 |
| Second: | P-Chloro-benzotrifluoride | 19.4 |
| Third: | Hexanes (95–99% n-Hexane) | 13 |
| Active: | Perfluoroalkylpolyether* | 35.3 |

*F-[CF(CF$_3$)CF$_2$-0]$_n$-CF$_2$CF$_3$, where n is an integer from 10 to 60

Composition B was prepared in the same manner as Composition A in Example 1. A stable single-phase system resulted which exhibited excellent solvent properties for maintaining the highly fluorinated oils in solution and permitted effective delivery of the oil to substrates.

Example 3

A penetrating oil composition was prepared in accordance with the present invention with the following composition:

Composition C

| Component | | % By Weight |
|---|---|---|
| First: | Methoxy-nonafluorobutane | 29.3 |
| Second: | Benzotrifluoride | 16.2 |
| Third: | Hexanes (95–99% n-Hexane) | 19.4 |
| Active: | Perfluoroalkylpolyether* Oil | 35.3 |

*F-[CF(CF$_3$)CF$_2$-0]$_n$-CF$_2$CF$_3$, where n is an integer from 10 to 60

Composition C also resulted in a single-phase system which remained stable and exhibited excellent thermal and chemical stability. The composition was extremely effective at delivering the oil between tight fitting parts and quickly evaporating to leave the oil behind.

Example 4

This example demonstrates a penetrating oil composition made in accordance with the present invention in aerosol form. An aerosol composition was formulated as shown below:

| Composition D | | |
|---|---|---|
| | Component | % By Weight |
| First: | Methoxy-nonafluorobutane | 17.9 |
| Second: | Benzotrifluoride | 9.9 |
| Third: | Hexanes (95–99% n-Hexane) | 11.9 |
| Active: | Perfluoroalkylpolyether* | 21.6 |
| Propellant: | Isobutane | 38.8 |

*F-[CF($CF_3$)$CF_2$-0]$_n$-$CF_2CF_3$, wherein n is an integer from 10 to 60

The components were added in succession beginning with the first component, i.e., methoxy-nonafluorobutane, and ending with the last component, i.e., propellant. After each component was added, the combination was thoroughly agitated. A clear single-phase system resulted. As seen from Table 1 above, hexane is only partially soluble in the perfluoroalkylpolyether. The present invention allows a relatively high percentage of alkane to be added while maintaining a single-phase system. The ability to include alkanes permits a cost-effective solvent system for fluorinated compounds to be made. Moreover, benzotrifluoride is not soluble in the perfluoralkylpolyether, making the result of obtaining a single phase system even move surprising. This result was quite unexpected and suggests a synergistic effect may exist between the three basic components and the perfluorinated oil. The above-mentioned composition was packaged in an aerosol container involving an 8 ounce (227 grams) charge in a 12 ounce (340.20 grams) aerosol can. When sprayed onto a substrate, the composition quickly evaporated leaving the oil on the substrate.

The components of composition C were combined in accordance with Example 3 above to form a stable single-phase system. Composition C was found to be an extremely effective penetrating oil composition, which possessed the ability to deliver the oil between tight fitting mechanical parts, the remainder of the composition quickly evaporating to leave the oil on the part. The composition also possessed the properties of low toxicity, high thermal and chemical stability.

Example 5

A penetrating oil composition in aerosol form was prepared in accordance with the present invention as shown below.

| Composition E | | |
|---|---|---|
| | Component | % By Weight |
| First: | Methoxy-nonafluorobutane | 19.9 |
| Second: | Benzotrifluoride | 11.9 |
| Third: | Hexane (95–99% n-Hexane) | 8 |
| Active: | Perfluoroalkylpolyether* | 21.6 |
| Propellant: | Tetrafluoroethane | 38.8 |

*F-[CF($CF_3$)$CF_2$-0]$_n$-$CF_2CF_3$, where n is an integer from 10 to 60

Each of the components of composition E were combined in the same manner as in Example 4. Again, a single-phase system surprisingly resulted and exhibited no flame extension when subjected to conventional aerosol flame extension tests. The composition exhibited the ability to deliver the fluorinated oil in an aerosol form onto a substrate and quickly evaporate leaving the oil on the substrate surface.

Example 6

The ability to achieve-single-phase compositions which are solvents for highly fluorinated oils with the use of the least costly fluorinated material is dependent on the presence of each of the three components of the present invention. Table 2 sets forth a series of two component compositions which were prepared by leaving out the alkane. Compositions 205643-1 through 205643-22 all contain as a first fluorinated component the compound methoxy-nonafluorobutane sold under the trade name HFE-7100 in combination with the aromatic fluorinated second component, which was either OXSOL 100 (p-chlorobenzotrifluoride) or OXSOL 2000 (benzotrifluoride). In those compositions using methoxy-nonafluorobutane in combination with p-chlorobenzotrifluoride, a single-phase was achievable even with the addition of the fluorinated oil (KRYTOX GPL-101), provided, however, the methoxy-nonafluorobutane was present in amounts greater than or equal to about 45% by weight of the two solvent components. Less than this amount of methoxy-nonafluorobutane resulted in a two phase system.

When methoxy-nonafluorobutane was combined with OXSOL 2000 (benzotrifluoride) a single phase was achievable provided the methoxy-nonafluorobutane was present at amounts greater than or equal to about 35% by weight of the two components. When the methoxy-nonafluorobutane was combined with OXSOL 550 [a combination of p-chlorobenzotrifluoride/monochlorotoluene (1:1)] a single phase was achievable when the methoxy-nonafluorobutane was present in amounts greater than or equal to about 75% by weight.

When the methoxy-nonafluorobutane was combined with OXSOL 1000 (3,4-dichlorobenzotrifluoride), a single phase was achievable only when the methoxy-nonafluorobutane was present at amounts of greater than or equal to about 60% by weight of the two components.

As seen from the first twenty-two compositions of Table 2 (205643-1 through 205643-22), single phases are possible in the absence of the alkane but require a substantial amount of relatively costly methoxy-nonafluorobutane. This highly fluorinated compound is extremely expensive relative to traditional solvents and one intent of the present invention is to minimize its use while maintaining a single phase solvent system.

Also in Table 2, the results are shown of experiments where a variety of alcohols were substituted for the alkane in an attempt to determine whether an alcohol could be substituted in the inventive compositions in place of the alkane to achieve a single phase system. As indicated in the table from compositions 205643-23 through 205643-54, only two phase systems resulted.

Also in Table 2, the results are shown of an attempt to make a two-component single phase solvent system by combining the fluorinated aromatic component of the present invention (i.e., benzotrifluoride) with the alkane (hexane), thereby deleting the methoxy-nonafluorobutane component. In each case, as shown in compositions 205643-55 through 205643-70, two phases resulted.

It is apparent from the experiments summarized in Table 2 that achievement of a single-phase fluorinated oil containing composition is readily achieved by the presence of the three component system of the present invention. Eliminating one of the components, i.e., the alkane, allows for a single phase system only by increasing the expensive highly fluorinated first component solvent material, i.e., methoxy-nonafluorobutane. As mentioned previously, one advantage of the present invention is that a cost effective solvent system can be achieved by the inclusion of a relatively inexpensive hydrocarbon solvent such as an alkane, the inclusion of which is contraindicated based on its solubility in the other components. In other cases, where alcohol is substituted for the alkane or the highly fluorinated methoxy-nonafluorobutane is eliminated, a two phase system results. While a multi-phase system may be useful, it is one advantage of the present invention that a single phase system can be achieved.

TABLE 2

| Formulation | KRYTOX GPL-101/ Wt (gms) | HFE-7100 Wt (gms) | (%) (1) | OXSOL 100 Wt (gms) | (%) (1) | OXSOL 2000 Wt (gms) | (%) (1) | Hexanes Wt (gms) | (%) (1) | Miscibility/ Comments |
|---|---|---|---|---|---|---|---|---|---|---|
| 205643-1 | 1 | 1.38 | 75 | 0.46 | 25 | — | — | — | — | Single Phase |
| 205643-2 | 1 | 1.10 | 60 | 0.74 | 40 | — | — | — | — | " |
| 205643-3 | 1 | 0.92 | 50 | 0.92 | 50 | — | — | — | — | " |
| 205643-4 | 1 | 0.83 | 45 | 1.01 | 55 | — | — | — | — | " |
| 205643-5 | 1 | 0.74 | 40 | 1.10 | 60 | — | — | — | — | Two Phases |
| 205643-6 | 1 | 0.46 | 25 | 1.38 | 75 | — | — | — | — | " |
| 205643-7 | 1 | 1.38 | 75 | — | — | 0.46 | 25 | — | — | Single Phase |
| 205643-8 | 1 | 1.10 | 60 | — | — | 0.74 | 40 | — | — | " |
| 205643-9 | 1 | 0.92 | 50 | — | — | 0.92 | 50 | — | — | " |
| 205643-10 | 1 | 0.74 | 40 | — | — | 1.10 | 60 | — | — | " |
| 205643-11 | 1 | 0.64 | 35 | — | — | 1.20 | 65 | — | — | " |
| 205643-12 | 1 | 0.55 | 30 | — | — | 1.29 | 70 | — | — | Single Phase but Cloudy |
| 205643-13 | 1 | 0.46 | 25 | — | — | 1.38 | 75 | — | — | Two Phases |

| Formulation | KRYTOX GPL-101/ Wt (gms) | HFE-7100 Wt (gms) | (%) (1) | OXSOL 550 Wt (gms) | (%) (1) | OXSOL 1000 Wt (gms) | (%) (1) | Hexanes Wt (gms) | (%) (1) | Miscibility/ Comments |
|---|---|---|---|---|---|---|---|---|---|---|
| 205643-14 | 1 | 1.66 | 90 | 0.18 | 10 | — | — | — | — | Single Phase |
| 205643-15 | 1 | 1.38 | 75 | 0.46 | 25 | — | — | — | — | " |
| 205643-16 | 1 | 1.29 | 70 | 0.55 | 30 | — | — | — | — | Two Phases |
| 205643-17 | 1 | 1.10 | 60 | 0.74 | 40 | — | — | — | — | " |
| 205643-18 | 1 | 0.92 | 50 | 0.92 | 50 | — | — | — | — | " |
| 205643-19 | 1 | 1.38 | 75 | — | — | 0.46 | 25 | — | — | Single Phase |
| 205643-20 | 1 | 1.10 | 60 | — | — | 0.74 | 40 | — | — | " |
| 205643-21 | 1 | 1.01 | 55 | — | — | 0.83 | 45 | — | — | Single Phase but Cloudy |
| 205643-22 | 1 | 0.92 | 50 | — | — | 0.92 | 50 | — | — | Two phases |

| Formulation | KRYTOX GPL-101/ Wt (gms) | HFE-7100 Wt (gms) | (%) (1) | OXSOL 100 Wt (gms) | (%) (1) | OXSOL 2000 Wt (gms) | (%) (1) | Isopropanol Wt (gms) | (%) (1) | Miscibility/ Comments |
|---|---|---|---|---|---|---|---|---|---|---|
| 205643-23 | 1 | — | — | 1.66 | 90 | — | — | 0.18 | 10 | Two Phases |
| 205643-24 | 1 | — | — | 1.38 | 75 | — | — | 0.46 | 25 | " |
| 205643-25 | 1 | — | — | 0.92 | 50 | — | — | 0.92 | 50 | " |
| 205643-26 | 1 | — | — | 0.46 | 25 | — | — | 1.38 | 75 | " |
| 205643-27 | 1 | — | — | — | — | 1.66 | 90 | 0.18 | 10 | " |
| 205643-28 | 1 | — | — | — | — | 1.38 | 75 | 0.46 | 25 | " |
| 205643-29 | 1 | — | — | — | — | 0.92 | 50 | 0.92 | 50 | " |
| 205643-30 | 1 | — | — | — | — | 0.46 | 25 | 1.38 | 75 | " |

| Formulation | KRYTOX GPL-101/ Wt (gms) | HFE-7100 Wt (gms) | (%) (1) | OXSOL 550 Wt (gms) | (%) (1) | OXSOL 1000 Wt (gms) | (%) (1) | Isopropanol Wt (gms) | (%) (1) | Miscibility/ Comments |
|---|---|---|---|---|---|---|---|---|---|---|
| 205643-31 | 1 | — | — | 1.66 | 90 | — | — | 0.18 | 10 | Two Phases |
| 205643-32 | 1 | — | — | 1.38 | 75 | — | — | 0.46 | 25 | " |
| 205643-33 | 1 | — | — | 0.92 | 50 | — | — | 0.92 | 50 | " |
| 205643-34 | 1 | — | — | 0.46 | 25 | — | — | 1.38 | 75 | " |
| 205643-35 | 1 | — | — | — | — | 1.66 | 90 | 0.18 | 10 | " |
| 205643-36 | 1 | — | — | — | — | 1.38 | 75 | 0.46 | 25 | " |
| 205643-37 | 1 | — | — | — | — | 0.92 | 50 | 0.92 | 50 | " |
| 205643-38 | 1 | — | — | — | — | 0.46 | 25 | 1.38 | 75 | " |

TABLE 2-continued

| | | Solvents | | | | | | | | | |
|---|---|---|---|---|---|---|---|---|---|---|---|
| | KRYTOX | HFE-7100 | | OXSOL 100 | | OXSOL 2000 | | Ethanol | | | |
| Formulation | GPL-101/ Wt (gms) | Wt (gms) | (%) (1) | Wt (gms) | (%) (1) | Wt (gms) | (%) (1) | Wt (gms) | (%) (1) | Miscibility/ Comments | |
| 205643-39 | 1 | — | — | 1.66 | 90 | — | — | 0.18 | 10 | Two Phases | |
| 205643-40 | 1 | — | — | 1.38 | 75 | — | — | 0.46 | 25 | " | |
| 205643-41 | 1 | — | — | 0.92 | 50 | — | — | 0.92 | 50 | " | |
| 205643-42 | 1 | — | — | 0.46 | 25 | — | — | 1.38 | 75 | " | |
| 205643-43 | 1 | — | — | — | — | 1.66 | 90 | 0.18 | 10 | " | |
| 205643-44 | 1 | — | — | — | — | 1.38 | 75 | 0.46 | 25 | " | |
| 205643-45 | 1 | — | — | — | — | 0.92 | 50 | 0.92 | 50 | " | |
| 205643-46 | 1 | — | — | — | — | 0.46 | 25 | 1.38 | 75 | " | |

| | | Solvents | | | | | | | | | |
|---|---|---|---|---|---|---|---|---|---|---|---|
| | KRYTOX | HFE-7100 | | OXSOL 550 | | OXSOL 1000 | | Ethanol | | | |
| Formulation | GPL-101/ Wt (gms) | Wt (gms) | (%) (1) | Wt (gms) | (%) (1) | Wt (gms) | (%) (1) | Wt (gms) | (%) (1) | Miscibility/ Comments | |
| 205643-47 | 1 | — | — | 1.66 | 90 | — | — | 0.18 | 10 | Two Phases | |
| 205643-48 | 1 | — | — | 1.38 | 75 | — | — | 0.46 | 25 | " | |
| 205643-49 | 1 | — | — | 0.92 | 50 | — | — | 0.92 | 50 | " | |
| 205643-50 | 1 | — | — | 0.46 | 25 | — | — | 1.38 | 75 | " | |
| 205643-51 | 1 | — | — | — | — | 1.66 | 90 | 0.18 | 10 | " | |
| 205643-52 | 1 | — | — | — | — | 1.38 | 75 | 0.46 | 25 | " | |
| 205643-53 | 1 | — | — | — | — | 0.92 | 50 | 0.92 | 50 | " | |
| 205643-54 | 1 | — | — | — | — | 0.46 | 25 | 1.38 | 75 | " | |

| | | Solvents | | | | | | | | | |
|---|---|---|---|---|---|---|---|---|---|---|---|
| | KRYTOX | HFE-7100 | | OXSOL 100 | | OXSOL 2000 | | Hexanes | | | |
| Formulation | GPL-101/ Wt (gms) | Wt (gms) | (%) (1) | Wt (gms) | (%) (1) | Wt (gms) | (%) (1) | Wt (gms) | (%) (1) | Miscibility/ Comments | |
| 205643-55 | 1 | — | — | 1.66 | 90 | — | — | 0.18 | 10 | Two Phases | |
| 205643-56 | 1 | — | — | 1.38 | 75 | — | — | 0.46 | 25 | " | |
| 205643-57 | 1 | — | — | 0.92 | 50 | — | — | 0.92 | 50 | " | |
| 205643-58 | 1 | — | — | 0.46 | 25 | — | — | 1.38 | 75 | " | |
| 205643-59 | 1 | — | — | — | — | 1.66 | 90 | 0.18 | 10 | " | |
| 205643-60 | 1 | — | — | — | — | 1.38 | 75 | 0.46 | 25 | " | |
| 205643-61 | 1 | — | — | — | — | 0.92 | 50 | 0.92 | 50 | " | |
| 205643-62 | 1 | — | — | — | — | 0.46 | 25 | 1.38 | 75 | " | |

| | | Solvents | | | | | | | | | |
|---|---|---|---|---|---|---|---|---|---|---|---|
| | KRYTOX | HFE-7100 | | OXSOL 550 | | OXSOL 1000 | | Hexanes | | | |
| Formulation | GPL-101/ Wt (gms) | Wt (gms) | (%) (1) | Wt (gms) | (%) (1) | Wt (gms) | (%) (1) | Wt (gms) | (%) (1) | Miscibility/ Comments | |
| 205643-63 | 1 | — | — | 1.66 | 90 | — | — | 0.18 | 10 | Two Phases | |
| 205643-64 | 1 | — | — | 1.38 | 75 | — | — | 0.46 | 25 | " | |
| 205643-65 | 1 | — | — | 0.92 | 50 | — | — | 0.92 | 50 | " | |
| 205643-66 | 1 | — | — | 0.46 | 25 | — | — | 1.38 | 75 | " | |
| 205643-67 | 1 | — | — | — | — | 1.66 | 90 | 0.18 | 10 | " | |
| 205643-68 | 1 | — | — | — | — | 1.38 | 75 | 0.46 | 25 | " | |
| 205643-69 | 1 | — | — | — | — | 0.92 | 50 | 0.92 | 50 | " | |
| 205643-70 | 1 | — | — | — | — | 0.46 | 25 | 1.38 | 75 | " | |

Example 7

A series of three component solvent compositions were prepared as shown in Table 3. In each of the compositions an alcohol was substituted for the alkane and the combination was further combined with the commercially available highly fluorinated oil KRYTOX GPL-101 (F-[CF(CF$_3$)CF$_2$—O]$_n$—CF$_2$CF$_3$; n=10–60). As can be seen from the table, only two phase systems resulted.

Example 8

Table 4 shows three component solvents systems having fluorobenzene as the fluorinated aromatic component. As can be seen from the table, only two phase systems were generated when the fluorobenzene was substituted for a benzotrifluoride analog.

Example 9

This example demonstrates that the order of addition of the individual components of the present invention does not affect the final physical state, i.e., whether a single or multi-phase system results. Compositions 205646-1 through 205646-6 in Table 5 varied the sequence of addition of each of the three components comprising the inventive compositions, while keeping the relative amounts of each of the components constant. Even though the order of addition differed in each of the six compositions, a single phase always resulted. The same results were achieved with compositions 205646-19 through 205646-24.

By way of comparison, alcohols were substituted for the alkane in each of formulations 205646-7 through 205646-18 as well as compositions 205646-25 through 205646-31. As shown from the table, the order of addition of the components were systematically varied, while keeping the relative amounts of the components constant for each of the different alcohol-containing compositions. The result in every case was a two phase system.

TABLE 3

| | | Solvents | | | | | | | | |
|---|---|---|---|---|---|---|---|---|---|---|
| | KRYTOX GPL-101 | HFE-7100 | | OXSOL 100 | | OXSOL 2000 | | Ethanol | | |
| Formulation | Wt (gms) | Wt (gms) | (%) (1) | Wt (gms) | (%) (1) | Wt (gms) | (%) (1) | Wt (gms) | (%) (1) | Miscibility/Comments |
| 205644-1 | 49 | 45.1 | 50 | 31.4 | 35 | — | — | 13.7 | 15 | Two phases |
| 205644-2 | 49 | 45.1 | 50 | 27 | 30 | — | — | 18.1 | 20 | " |
| 205644-3 | 49 | 45.1 | 50 | — | — | 22.5 | 25 | 22.5 | 25 | " |
| 205644-4 | 49 | 40.7 | 45 | — | — | 27 | 30 | 22.5 | 25 | " |
| 205644-5 | 49 | 40.7 | 45 | — | — | 22.5 | 25 | 27 | 30 | " |

(1) Percentage of this solvent in the solvent mixture-not the formulations (i.e., does not include KRYTOX GPL-102 or propellant.)

| | | Solvents | | | | | | | | |
|---|---|---|---|---|---|---|---|---|---|---|
| | KRYTOX GPL-101 | HFE-7100 | | OXSOL 100 | | OXSOL 2000 | | Isopropanol | | |
| Formulation | Wt (gms) | Wt (gms) | (%) (1) | Wt (gms) | (%) (1) | Wt (gms) | (%) (1) | Wt (gms) | (%) (1) | Misciblity/Comments |
| 205644-6 | 49 | 45.1 | 50 | 31.4 | 35 | — | — | 13.7 | 15 | Two Phases |
| 205644-7 | 49 | 45.1 | 50 | 27 | 30 | — | — | 18.1 | 20 | " |
| 205644-8 | 49 | 45.1 | 50 | — | — | 22.5 | 25 | 22.5 | 25 | " |
| 205644-9 | 49 | 40.7 | 45 | — | — | 27 | 30 | 22.5 | 25 | " |
| 205644-10 | 49 | 40.7 | 45 | — | — | 22.5 | 25 | 27 | 30 | " |

Notes: The formulations above are analogous to the 205635-X formulations shown below with alkanols replacing the hexanes in the latter. Since none of the formulations shown above are single phase systems, alkanols such as ethanol and isopropanol apparently cannot be used to replace hexanes in the 205635-X formulations.

| Formulation Shown Above | Analogous Formulation with Hexanes |
|---|---|
| 205644-1 | 205635-B |
| 205644-2 | 205635-C |
| 205644-3 | 205635-D |
| 205644-4 | 205635-E |
| 205644-5 | 205635-F |
| 205644-6 | 205635-B |
| 205644-7 | 205635-C |
| 205644-8 | 205635-D |
| 205644-9 | 205635-E |
| 205644-10 | 205635-F |

TABLE 4

| | | Solvents | | | | | | |
|---|---|---|---|---|---|---|---|---|
| | KRYTOX GPL-101 | HFE-7100 | | Fluorobenzene | | Hexanes | | Miscibility/ |
| Formulation | Wt (gms) | Wt (gms) | (%) (1) | Wt (gms) | (%) (1) | Wt (gms) | (%) (1) | Comments |
| 205645-1 | 49 | 45.1 | 50 | 31.4 | 35 | 13.7 | 15 | Two phases |
| 205645-2 | 49 | 45.1 | 50 | 27 | 30 | 18.1 | 20 | " |
| 205645-3 | 49 | 45.1 | 50 | 22.5 | 25 | 22.5 | 25 | " |

TABLE 4-continued

| | | | | | | | | |
|---|---|---|---|---|---|---|---|---|
| 205645-4 | 49 | 40.7 | 45 | 27 | 30 | 22.5 | 25 | " |
| 205645-5 | 49 | 40.7 | 45 | 22.5 | 25 | 27 | 30 | " |

Notes:
The formulations above are analogous to the 205635-X formulations shown below with alkanols replacing the hexanes in the latter. Since none of the formulations shown above are single phase systems, alkanols such as ethanol and isopropanol apparently cannot be used to replace hexanes in the 205635-X formulations.
(1) Percentage of this solvent in the solvent mixture -- not the fomulation (i.e., does not include KRYTOX GPL-101 or propellant).

| Formulation Shown Above | Analogous Formulation with Hexanes |
|---|---|
| 205644-1 | 205635-B |
| 205644-2 | 205635-C |
| 205644-3 | 205635-D |
| 205644-4 | 205635-E |
| 205644-5 | 205635-F |
| 205644-6 | 205635-B |
| 205644-7 | 205635-C |
| 205644-8 | 205635-D |
| 205644-9 | 205635-E |
| 205644-10 | 205635-F |

Aerosol compositions in accordance with the present invention were prepared as set forth in Table 6. Each of the compositions, except for 205635-F2, was packaged in a standard twelve ounce aerosol container having an eight ounce charge. Composition 205635-F2 had only a four ounce charge. The other four ounces of this composition were used in a glass aerosol package in order to confirm that the composition was clear, homogenous and in a single phase subsequent to charging with the propellant, isobutane. The composition in the glass aerosol package was crystal clear without any sign of haziness or phase separation. A similar glass aerosol package containing only the fluorinated oil (KRYTOX GPL-101) and the isobutane propellant exhibited a phase separation even after vigorous shaking. This result indicates the necessity of the second component of the inventive compositions being a fluorinated component compatible with the fluorinated oil in order to achieve a single phase. Moreover, the phase separation obtained with just a combination of fluorinated oil and the propellant confirm published reports by Dupont, manufacturer of the fluorinated oil used, that these oils are virtually insoluble in common organic solvents.

Each of the aerosol compositions in accordance with the present invention set forth in Table 6 were sprayed on to a steel surface to observe the quality of the deposition, flow and solvent evaporation as well as the resultant oil film left subsequent to evaporation of the solvent. Virtually all of the formulations exhibited little or no icing.

Six of the compositions from Table 6 were subjected to flammability testing. The results are set forth in Table 7.

The formulations of Table 6 were tested for the time required for the solvent to evaporate and leave the oil on the part. The results are provided in Table 8. It should be noted that the formulations with carbon dioxide propellant have a stronger aerosol stream when sprayed relative other propellants. Additionally, compositions containing the combination of benzotrifluoride (OXSOL 2000) and 25–30% hexanes appear to evaporate much more quickly than those compositions which contain p-chlorobenzotrifluoride (OXSOL 100) and 0–20% hexanes. Each of the aerosol compositions was sprayed onto steel Q-panels with the time required for solvent evaporation recorded. Each formulation was shaken before use and sprayed onto the steel Q-panel for about three seconds at a distance of twelve inches. The spray tests were conducted at ambient conditions. All formulations exhibited good flow and good films without signs of icing.

TABLE 7

| Formulation | Observations | Propellant |
|---|---|---|
| 205635-B2 | No flame extension | 134a |
| 205635-D2 | " | 134a |
| 205635-D4 | Greater than 10" (25.4 cm) flame extension, no flashback | $CO_2$ |
| 205635-F1 | Greater than 18" (45.72 cm) flame extension, with flashback | A-31 |
| 205635-F2 | No flame extension | 134a |
| 205635-F4 | Greater than 18" (45.72 cm) flame extension, no flashback | $CO_2$ |

A-31 = isobutane
134a = 1,1,1,2-tetrafluaroethane
A-70 = propane (41.9 wt %) and isobutane (58.1 wt %)
$CO_2$ = carbon dioxide

TABLE 8

| Formulation | Time Required for Solvent to Evaporate | Propellant |
|---|---|---|
| 205635-A1 | 1 min. 25 sec. | A-31 |
| 205635-A2 | 1 min. 15 sec. | 134z |
| 205635-A3 | 1 min. 19 sec. | A-70 |
| 205635-A4 | N/A* | $CO_2$ |
| 205635-B1 | 1 min. 12 sec. | A-31 |
| 205635-B2 | 1 min. 11 sec. | 134a |
| 205635-B3 | 1 min. 16 sec. | A-70 |
| 205635-B4 | N/A* | $CO_2$ |
| 205635-C1 | 1 min. 1 sec. | A-31 |
| 205635-C2 | 1 min. 6 sec. | 134a |
| 205635-C3 | 1 min. 13 sec. | A-70 |
| 205635-C4 | N/A* | $CO_2$ |
| 205635-DI | 16 sec. | A-31 |
| 205635-D2 | 11 sec. | 134a |
| 205635-D3 | 12 sec. | A-70 |
| 205635-D4 | N/A* | $CO_2$ |
| 205635-E1 | 17 sec. | A-31 |
| 205635-E2 | 11 sec. | 134a |
| 205635-E3 | 13 sec. | A-70 |
| 205635-E4 | N/A* | $CO_2$ |
| 205635-F1 | 17 sec. | A-31 |
| 205635-F2 | 12 sec. | 134a |

TABLE 8-continued

| Formulation | Time Required for Solvent to Evaporate | Propellant |
|---|---|---|
| 205635-F3 | 14 sec. | A-70 |
| 205635-F4 | N/A* | $CO_2$ |

A-31 = isobutane
134a = 1,1,1,2-tetrafluaroethane
A-70 = propane (41.9 wt %) and isobutane (58.1 wt %)
$CO_2$ = carbon dioxide The invention being thus described, it will be clear to those of skill in the art that many variations thereof may exist. Such variations are not to be regarded as a departure from the spirit and scope of the invention, and all such variations are intended to be included within the scope of the claims.

What is claimed is:

1. A composition comprising:
   a) a first component comprising a fluorinated compound;
   b) a second component comprising a fluorinated aromatic compound; and
   c) a third component comprising an alkane, wherein the fluorinated compound of the first component corresponds to the formula $F_3CCF_2CF_2CF_2OCH_3$.

2. The composition of claim 1, wherein the compound of the first component includes a fluorinated portion which is substantially soluble in a fluorinated oil.

3. The composition of claim 1, wherein the second component is substantially insoluble in fluorinated oil.

4. The composition of claim 1, wherein the alkane is substantially insoluble in fluorinated oil.

5. The composition of claim 1, being substantially soluble in fluorinated oil.

6. The composition of claim 1, wherein the first fluorinated compound is present in amounts of about 25% by weight or greater.

7. The composition of claim 1, wherein the second fluorinated component is a fluorinated benzene compound.

8. The composition of claim 7, wherein the second fluorinated benzene compound is selected from the group consisting of benzotrifluoride, p-chlorobenzotrifluoride, dichlorobenzotrifluoride, trifluorotoluene and combinations thereof.

9. The composition of claim 1, wherein the alkane corresponds to the general formula $C_nH_{2n+2}$, wherein n is an integer from 5 to 20.

10. The composition of claim 1, wherein the alkane is present in amounts of at least about 2% by weight.

11. The composition of claim 1, wherein the first fluorinated component is present in amounts up to about 60% by weight.

12. The composition of claim 1, wherein the second fluorinated component is present in amounts of about 5% to about 50% by weight.

13. The composition of claim 1, wherein the second fluorinated component is benzotrifluoride or p-chlorobenzotrifluoride in amounts of about 5% to about 30% by weight.

14. The composition of claim 1, further comprising an additive selected from the group consisting of anti-wear and extreme pressure additives, friction and lubricity modifiers, corrosion inhibitors, oxidation inhibitors, thermal stabilizers, viscosity modifiers and combinations thereof.

15. A solvent composition for fluorinated oils comprising the composition of claim 1.

16. The composition of claim 1, being in a single phase.

17. The composition of claim 14, wherein the composition further includes a fluorinated oil.

18. The composition of claim 17, wherein the composition is a single phase.

19. The composition of claim 17, wherein the composition is a dispersion or an emulsion.

20. The composition of claim 1, wherein the composition further includes an aerosol propellant.

21. A composition comprising:
   a) a first component comprising a fluorinated compound;
   b) a second component comprising a fluorinated aromatic compound;
   c) a third component comprising an alkane; and
   d) an aerosol propellant.

22. The composition of claim 21, wherein the propellant is selected from the group consisting of carbon dioxide, isobutane, dimethylether, 1,1,1,2-tetrafluorethane and combinations thereof.

23. The composition of claim 21, further comprising an additive selected from the group consisting of anti-wear and extreme pressure additives, friction and lubricity modifiers, corrosion inhibitors, oxidation inhibitors, thermal stabilizers, viscosity modifiers and combinations thereof.

24. A composition comprising:
   a) a first component comprising a fluorinated compound; present in amounts of about 25% or greater by weight
   b) a second component comprising a fluorinated aromatic compound;
   c) a third component comprising an alkane; and
   d) a fluorinated oil.

25. The composition of claim 24, wherein the fluorinated oil is a compound corresponding to one of the formulas selected from the group consisting of $CF_3CF_2CF_2O-[CF(CF_3)CF_2-O-]_nCF_2CF_3$, $CF_3O-[CF(CF_3)CF_2-O-]_y-[CF_2-O]_mCF_3$, $CF_3O-[CF_2CF_2-O-]_z-[CF_2-O-]_pCF_3$, $CF_3CF_2CF_2-O-[CF_2CF_2CF_2-O-]_qCF_2CF_3$, halocarbons containing the repeating group $-(CF_2CFCl)-_r$ and combinations thereof; wherein n is an integer from 0 to 60; y is an integer from 0 to 60; m is an integer from 0 to 60; z is an integer from 0 to 60; p is an integer from 0 to 60; and q is an integer from 0 to 60; and r is an integer from 2 to 10.

26. The composition of claim 24, being a solution.

27. The composition of claim 24, being a dispersion or emulsion.

28. The composition of claim 24, further comprising an additive selected from the group consisting of anti-wear and extreme pressure additives, friction and lubricity modifiers, corrosion inhibitors, oxidation inhibitors, thermal stabilizers, viscosity modifiers and combinations thereof.

29. A fluorinated oil composition, comprising:
   a) a fluorinated oil; and
   b) a combination of components compatible with the oil, the combination comprising:
      i) a first component comprising a fluorinated compound;
      ii) a second component different from the first comprising a fluorinated aromatic compound; and
      iii) a third component comprising an alkane.

30. The composition of claim 29, wherein the fluorinated oil is a perfluoropolyether oil.

31. The composition of claim 29, wherein the fluorinated oil is a compound selected from one of the group consisting of $CF_3CF_2CF_2O-[CF(CF_3)CF_2-O-]_nCF_2CF_3$, $CF_3O-$

[CF (CF$_3$) CF$_2$—O—]$_y$—[CF$_2$—O]$_m$CF$_3$, CF$_3$O—[CF$_2$CF$_2$—O—]$_z$—[CF$_2$—O—]$_p$CF$_3$, CF$_3$CF$_2$CF$_2$—O—[CF$_2$CF$_2$CF$_2$—O—]$_q$CF$_2$CF$_3$, halocarbons containing the repeating group —(CF$_2$(CFCl)$_r$— and combinations thereof; wherein n is an integer from 0 to 60; y is an integer from 0 to 60; m is an integer from 0 to 60; z is an integer from 0 to 60; p is an integer from 0 to 60; and q is an integer from 0 to 60; and r is an integer from 2 to 10.

32. The composition of claim 29, wherein the fluorinated oil corresponds to the formula F[CF(CF$_3$)CF$_2$O]$_n$CF$_2$CF$_3$, wherein n is an integer from 10 to 60.

33. The composition of claim 29, further including an aerosol propellant.

34. The composition of claim 33, wherein the propellant is selected from the group consisting of carbon dioxide, dimethylether, isobutane, 1,1,1,2-tetrafluoroethane and combinations thereof.

35. The composition of claim 29, wherein the first component is present in amounts of up to about 60% by weight of the combination.

36. The composition of claim 29, wherein the second component is present in amounts of about 5% to about 60% by weight of the combination.

37. The composition of claim 33, wherein the first component of the combination is methoxy-nonafluorobutane.

38. The composition of claim 29, wherein the second component comprises a fluorinated benzene compound.

39. The composition of claim 38, wherein the fluorinated benzene compound is selected from the group consisting of benzotrifluoride, p-chlorobenzotrifluoride, dichlorobenzotrifluoride, trifluorotoluene and combinations thereof.

40. A fluorinated oil aerosol composition, comprising:
    a) a fluorinated oil;
    b) a combination of components compatible with the oil, the combination comprising:
        i) a first component comprising a fluorinated compound present in amounts of about 25% or greater by weight of the combination;
        ii) a second component different from the first comprising a fluorinated aromatic compound present in amounts of about 5% to about 10% by weight of the combination; and
        iii) a third component comprising an alkane; and
    c) an aerosol propellant.

41. The composition of claim 40, wherein the first component is selected from the group consisting of fluorinated alkanes having from 4 to 10 carbons, a fluorinated alkylether corresponding to the general formula R$^1$OR$^2$, wherein R$^1$ and R$^2$ may be the same or different and are fluorinated alkyl groups having from 1 to 4 carbon atoms and combinations thereof; and the second component is selected from the group consisting of benzotrifluoride, p-chlorobenzotrifluoride, dichlorobenzotrifluoride, trifluorotoluene and combinations thereof; and the alkane corresponds to the general formula C$_n$H$_{2n+2}$, wherein n is an integer from 2 to 20.

42. The composition of claim 40, wherein the fluorinated oil is a compound corresponding to one of the formulas selected from the group consisting of CF$_3$CF$_2$CF$_2$O—[CF (CF$_3$)CF$_2$—O—]$_n$CF$_2$CF$_3$, CF$_3$O—[CF(CF$_3$)CF$_2$—O—]$_y$—[CF$_2$—O]$_m$CF$_3$, CF$_3$O—[CF$_2$CF$_2$—O—]$_z$—[CF$_2$—O—]$_p$CF$_3$, CF$_3$CF$_2$CF$_2$—O—[CF$_2$CF$_2$CF$_2$—O—]$_q$CF$_2$CF$_3$, halocarbons containing the repeating group —(CF$_2$CFCl)$_r$— and combinations thereof; wherein n is an integer from 0 to 60; y is an integer from 0 to 60; m is an integer from 0 to 60; z is an integer from 0 to 60; p is an integer from 0 to 60; q is an integer from 0 to 60; and r is an integer from 2 to 10.

43. An article of manufacture comprising:
    a) a container for packaging a flowable composition; and
    b) a flowable composition within the container, the composition comprising:
        i) a first component comprising a fluorinated compound;
        ii) a second component different from the first comprising a fluorinated aromatic compound; and
        iii) a third component comprising an alkane.

44. The article of claim 43, wherein the container includes means for dispensing the composition.

45. The article of claim 44, wherein the composition further comprises an aerosol propellant.

46. The article of claim 43, wherein the container comprises a flexible bladder for containing a flowable composition, the bladder being disposed within a housing so as to define an internal space between the exterior wall of the flexible bladder and interior wall of the housing.

47. The article of claim 46, wherein the flexible bladder is permeable.

48. A method of cleaning an oil or a grease from a substrate, comprising the steps of:
    a) providing a composition comprising:
        i) a first component comprising a fluorinated compound corresponding to the formula F$_3$CCF$_2$CF$_2$CF$_2$OCH$_3$; and
        ii) a second component different from the first comprising a fluorinated aromatic compound; and
        iii) a third component comprising an alkane; and
    b) applying the composition to the oil or grease to facilitate removal of the oil or grease from the substrate.

49. A method of manufacturing a fluorinated oil composition, comprising the steps of:
    a) providing a composition comprising:
        i) a first component comprising a fluorinated compound;
        ii) a second component different from the first comprising a fluorinated aromatic compound; and
        iii) a third component comprising an alkane; and
    b) combining the composition of step a) with a fluorinated oil.

* * * * *